United States Patent
Racz et al.

(10) Patent No.: US 8,542,608 B2
(45) Date of Patent: Sep. 24, 2013

(54) METHOD FOR ACHIEVING AN OPTIMAL SHAPING RATE FOR A NEW PACKET FLOW

(75) Inventors: Sandor Racz, Cegled (HU); Szilveszter Nadas, Budapest (HU); Zoltan Nagy C, Szeged (HU); Pal Palyi, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 290 days.

(21) Appl. No.: 13/000,407

(22) PCT Filed: Jun. 12, 2009

(86) PCT No.: PCT/SE2009/050726
§ 371 (c)(1),
(2), (4) Date: Dec. 21, 2010

(87) PCT Pub. No.: WO2009/157854
PCT Pub. Date: Dec. 30, 2009

(65) Prior Publication Data
US 2011/0116406 A1 May 19, 2011

Related U.S. Application Data (60) Provisional application No. 61/076,230, filed on Jun. 27, 2008.

(51) Int. Cl.
*H04L 12/26* (2006.01)
(52) U.S. Cl.
USPC ............................. 370/252; 370/235; 370/253
(58) Field of Classification Search
USPC .......................................... 370/252, 235, 253
See application file for complete search history.

(56) References Cited

U.S. PATENT DOCUMENTS

| | | | |
|---|---|---|---|
| 6,108,305 A | 8/2000 | Charny et al. | |
| 6,337,851 B1 * | 1/2002 | Charny et al. | 370/232 |
| 2007/0280245 A1 | 12/2007 | Rosberg | |
| 2008/0137537 A1 | 6/2008 | Al-Manthari et al. | |

FOREIGN PATENT DOCUMENTS

| | | |
|---|---|---|
| WO | 2005062497 A1 | 7/2005 |
| WO | 2007050191 A1 | 5/2007 |

OTHER PUBLICATIONS

Altman, E., et al., "Fairness in MIMD Congestion Control Algorithms", INRIA, No. 5312, Sep. 2004, 31 pages.
Chiu, D., et al., "Analysis of the Increase and Decrease Algorithms for Congestion Avoidance in Computer Networks", Computer Networks and ISDN Systems, vol. 17, Jun. 1989, pp. 1-14.
Palyi, P., et al., "Fairness-Optimal Initial Shaping Rate for HSDPA Transport Network Congestion Control", Nov. 19-21, 2008, pp. 1415-1421, XP031400270.

* cited by examiner

*Primary Examiner* — Anh-Vu Ly
*Assistant Examiner* — Hashim Bhatti
(74) *Attorney, Agent, or Firm* — Rothwell, Figg, Ernst & Manbeck, P.C.

(57) ABSTRACT

The present invention relates to a method and an arrangement in a communication network node (15) of achieving an optimal initial shaping rate for a new packet flow on a transport network between said communication network node (15) and a second communication network node (10) in a communication network system. The shaping rates of ongoing packet flows on said transport network are determined. And, based on said determined shaping rates of ongoing packet flows, an initial shaping rate for said new packet flow is selected so as to obtain a maximized fairness among all shaping rates.

12 Claims, 8 Drawing Sheets

METHOD FOR ACHIEVING AN OPTIMAL SHAPING RATE FOR A NEW PACKET FLOW

CROSS-REFERENCE TO RELATED APPLICATIONS

This application is a 35 U.S.C. §371 National Phase Entry Application from PCT/SE2009/050726, filed Jun. 12, 2009, and designating the United States, and claims priority to Provisional Application No. 61/076,230, filed Jun. 27, 2008. The above-mentioned applications are incorporated by reference herein.

TECHNICAL FIELD

The present invention relates to a method and arrangement in a communication network system, in particular to an arrangement for achieving an optimal initial shaping rate for a data flow as well as a method for such achievement.

BACKGROUND

In a communication network system such as the UMTS terrestrial radio access network (UTRAN), there are two potential bottlenecks, namely, the air interface and the transport network (transport link) connecting the radio network controller (RNC) and Node B. The transport link between the RNC and Node B is a potential bottleneck when its capacity is smaller then the available maximal capacity of the Uu interface. For example, a typical scenario is that the Node B is connected to the RNC through an E1 link with a capacity of approximately 2 Mbps, and in this case the available Uu capacity for the high speed downlink packet access (HSDPA) may be significantly larger that 2 Mbps. This means that a single user equipment (UE) with good radio conditions can overload the transport network (TN).

Figure 2:
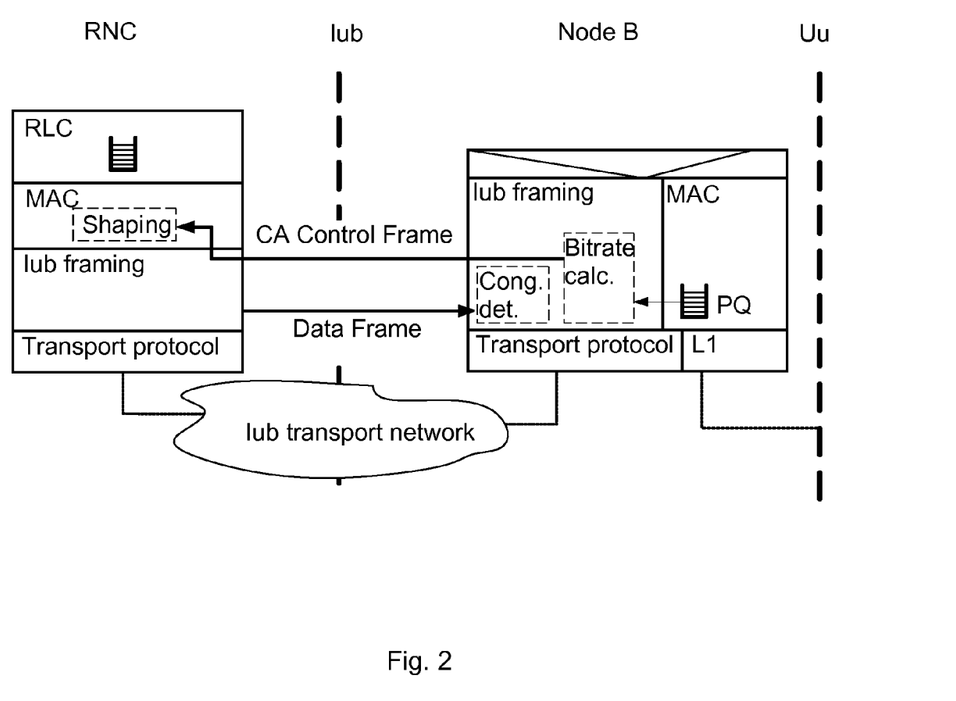
FIG. 2 shows the location of a flow control in the protocol stack.

The fair sharing of Uu resources is the task of the Uu scheduler, but the Uu scheduler can not cope with the TN bottleneck, i.e. the transport link bottleneck. In order to deal with the TN bottleneck a flow-control (FC) mechanism has been introduced. FIG. 2 shows the location of the FC in the protocol stack. The goal of the FC is to efficiently use the TN in a fair manner.

Lack of FC causes serious performance degradation when the transport network is the bottleneck. In this case the TN buffer is typically full, causing high TN delay and loss ratio. This causes exhaustive radio link control (RLC) retransmissions which results in a much lower throughput. In addition to this, an RLC reset and a consequent transmission control protocol (TCP) timeout may also occur.

The flow control operates per-flow basis, i.e. each HSDPA flow has its own (i) congestion detection, (ii) bitrate calculation and (iii) shaper part. The main tasks of these three parts are the following:

1) Congestion Detection Part in the Node B

Based on the arrived packets from the RNC there is an attempt to determine the congestion level of the transport network. If TN congestion is detected, the bitrate calculation part is informed. A gap in sequence numbers of arriving packets is interpreted as "hard" congestion, because with a very high probability this event is due to packet loss in the TN caused by serious congestion. In addition to this, the variation of the one-way packet delay between RNC and Node B is also measured, i.e. a given fraction of packets have a time-stamp. If this delay starts to increase, probably due to queue build up in the TN, then it is interpreted as "soft" congestion, but if this delay build up is getting too large, e.g. larger than 60 ms, it is interpreted as "hard" congestion. The bitrate calculation part will react on hard and soft congestions in different ways.

2) Bitrate Calculation Part in the Node B

This part of the flow control calculates the current maximum bitrate of the flow. This bitrate is allowed by the transport network for that flow. The applied algorithm is conformed with the additive increase multiplicative decrease (AIMD) property that guarantees convergence to fairness; all flows converge to an equal share of resources in steady state, where no flows join or leave. The FC maintains an internal variable for the maximum bitrate of the flow. This bitrate is increased linearly if there is no TN congestion, i.e. no reported congestion from congestion detection part. If congestion is reported, the bitrate is reduced by 50% in case of hard congestion and reduced by 10% in case of soft congestion. When a new flow arrives, in this way a new FC entity is created, a slow-start like mechanism is used to find out the proper starting bitrate of the flow. After the first congestion, the FC behaves the above described AIMD manner. If the calculated bitrate of the flow changes significantly, then the shaper is informed about the new bitrate through a control frame called a capacity allocation (CA). To avoid too high processing load, this part of the FC is executed periodically with a 100-ms period, i.e. the bitrate calculation part is executed every 100 ms.

3) Flow Shaper in the RNC

The task of the shaper is to shape the flow according to the signalled maximum flow bitrate. This bitrate is coming from the latest received CA control frame.

The current HSDPA flow control solution provides fairness only in long term due to the convergence of AIMD property in case of a TN bottleneck. Fairness is provided only among flows sharing the same TN bottleneck. The initial shaping rate calculated by the FC has significant effect of the fairness and the time of the convergence. If a new flow arrives into the cell, e.g. due to handover, the existing algorithm operates as follows:

Firstly, it estimates maximum achievable bandwidth on the transport network (maxHsRate) and the maximum achievable peak rate for HS in the given cell (maxUuRate).

Secondly, it counts the number of active flows belonging to the Node B (nPqsRbs) and to the cell (nPqsCell). Noticeable is that the new flow also is counted in these counters.

Finally, it calculates the average bitrate on the transport network and in the cell by dividing the bitrates by the number of ongoing flows respectively. Then it chooses the minimum of them as initial shaping rate of the new flow. Additionally, there is an upper limit (hsSsStartPointMax) for the initial shaping rate to avoid too high initial rates.

In another words, this calculation estimates the theoretical fair bandwidth share from the estimated maximum available bandwidth assuming the system is fully utilized and the flows share it equally. Then it sets this as the starting point of the new flow. For instance, if the maximum achievable bandwidth on the transport network is 2 Mbps, the maximum achievable peak rate in the cell is 3.6 Mbps, on the transport there are 5 parallel flows, but on the cell there are only 3 flows and the hsSsStartPointMax is 500 kbps then, the initial shaping rate of the new flow is:

$$CA_{initial} = \min(2\ Mbps/6;\ 3.6\ Mbps/4;\ 500\ kbps) = 333\ kbps \quad (1)$$

Noticeable is that this calculation contradicts the per-flow manner, since the number of flows is aggregated information about the system. In case of steady state, when the HSDPA flow control entities have enough time to find the fair share of the flows, and there is unused capacity neither in the transport network nor in the cell, the above introduced methodology provides good estimation of the fair share, so the convergence will be very fast.

However, the above described solution requires an estimation of the maximum achievable transport network bitrate. One option for this estimate is a parameter configured based on knowledge about the transport network architecture.

Further, the initial bitrate calculation relies on rough estimations and, the initial bitrate calculation does not take fairness into account.

If the estimation of the maximum achievable bandwidth on transport network (maxHsRate) or the maximum achievable peak cell rate (maxUuRate) is not accurate, they typically overestimates the real ones, the initial shaping rate will be quite far from the optimal and also in terms of fairness. Typically the actual available bitrate for HSDPA is smaller than the maximum, due to the bitrate used by higher priority traffic.

SUMMARY

Accordingly, one objective with embodiments of the present invention is to provide a method and an arrangement in a communication network node of achieving an optimal initial shaping rate for a new packet flow on a transport network between said communication network node and a second communication network node in a communication network system.

According to a first aspect of embodiments of the present invention this objective is achieved through a method as defined in the characterizing portion of claim 1, which specifies that an optimal initial shaping rate for a new packet flow is achieved by a method which performs the steps of determining shaping rates of ongoing packet flows on said transport network; and, based on said determined shaping rates of ongoing packet flows, selecting an initial shaping rate for said new packet flow so as to obtain a maximized fairness among all shaping rates.

According to a second aspect of embodiments of the present invention this objective is achieved through an arrangement as defined in the characterizing portion of claim 7, which specifies that an optimal initial shaping rate for a new packet flow is achieved by an arrangement which comprises a processing unit arranged to determine shaping rates of ongoing packet flows on said transport network and to select an initial shaping rate for said new packet flow based on said determined shaping rates of ongoing packet flows, so as to obtain a maximized fairness among all shaping rates.

Further embodiments are listed in the dependent claims.

Thanks to the provision of a method and a communication network node, which select an initial shaping rate that maximizes the fairness after the flow arrival, the need for a parameter or algorithm estimating the maximum available transport network bitrate is removed. Also, the system fairness when the system is transport network limited is improved. In addition to this the TCP throughput is also improved. Further, convergence for different TNL QoS levels is better supported.

It also partially solves the problem of too slow ramp-up. This is better than having a fixed high or fixed low starting bitrate for slow start method. The starting bitrate always reflects actual conditions on the TN bottleneck.

Further, fairness and ramp-up speed improvement is expected to be even more important in case of small downloads, e.g. small web pages. The original algorithm might not have enough time to converge to a fair share, because these connections are short in time.

Still other objects and features of embodiments of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For a better understanding, reference is made to the following drawings and preferred embodiments of the invention. In the drawings, wherein like reference characters denote similar elements throughout the several views.

DETAILED DESCRIPTION

Figure 1:
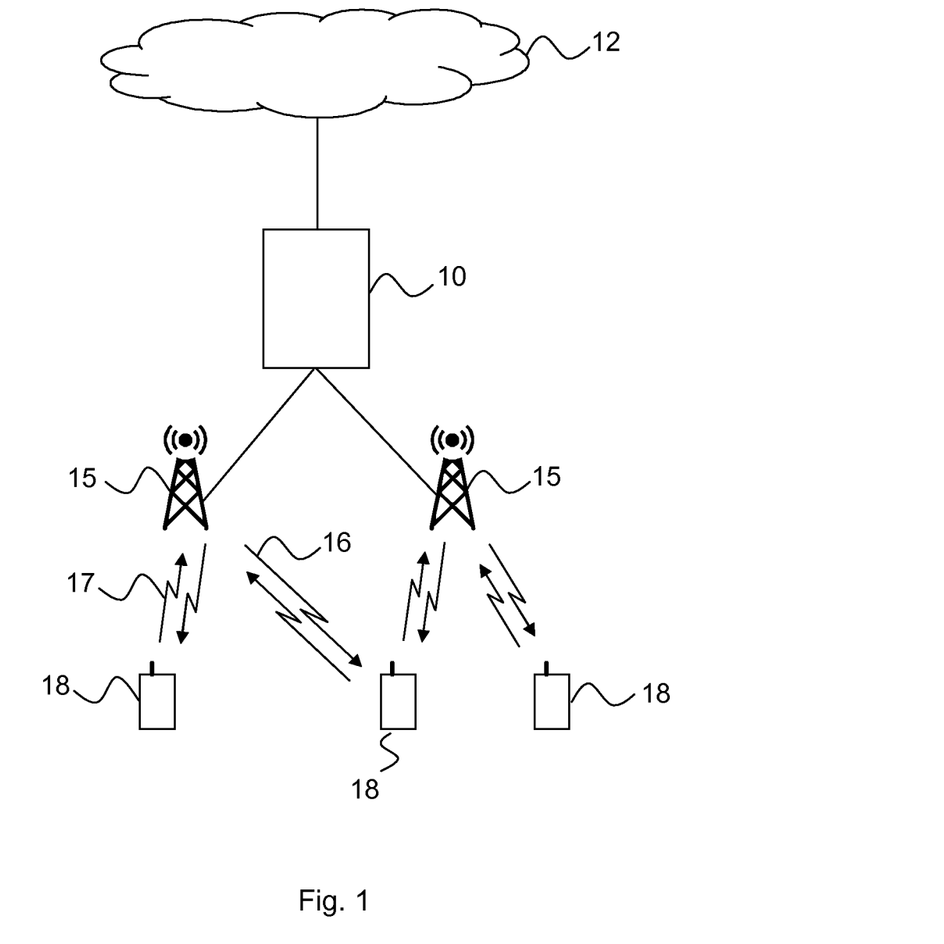
FIG. 1 shows a communication network architecture according to embodiments of the present invention.

FIG. 1 depicts a communication system including a radio access network (RAN), such as the UMTS terrestrial radio access network (UTRAN) architecture, comprising at least one radio base station (RBS) (eNode B or Node B) 15 (two are shown in FIG. 1) connected to one or more radio network controllers (RNCs) 10. The RAN is connected to a core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and downlink channel denoted 16. On the downlink channel 16, the RBS 15 transmits to each user equipment 18 at a respective power level. On the uplink channel 17, the user equipments 18 transmit data to the RBS 15 at respective power levels.

According to a preferred embodiment of the present invention, the communication system is herein described as an HSDPA communication system. The skilled person, however, realizes that the inventive method and arrangement works very well on other communications systems as well, wherein a rate based or window-based congestion control is used where flows share the same bottleneck. The user equipments 18 may be mobile stations such as mobile telephones ("cellular" telephones) and laptop computers with mobile termination and thus may be, for example, portable, pocket, hand-held, computer-included, or car-mounted mobile devices which communicate voice and/or data with the RAN.

The transport link between the RNC 10 and Node B 15 is a potential bottleneck when its capacity is smaller then the available maximal capacity of the Uu interface. In order to deal with the transport network bottleneck, a flow control (FC) has been introduced. FIG. 2 shows the location of the FC in the protocol stack. The flow control operates per-flow basis, i.e. each HSDPA flow has its own (i) congestion detection, (ii) bitrate calculation and (iii) shaper part.

The current HSDPA flow control solution provides fairness only in long term due to the convergence of additive increase multiplicative decrease (AIMD) property in case of a TN bottleneck. Fairness is provided only among flows sharing the same TN bottleneck as discussed further above.

According to embodiments of the present invention, a HSDPA flow control with optimal initial shaping rate is provided. If the shaping rates of the ongoing flows are known, the initial shaping rate of an arriving new flow will be that value which gives best fairness among all possible shaping rates. Practically, an initial shaping rate that maximizes the fairness after the flow arrival is selected.

Below, theoretical calculations behind embodiments of the present invention are described.

The Jain's fairness index is defined as follows:

$$F_{Jain's}(CA_1, \ldots, CA_n) \stackrel{def}{=} \frac{\left(\sum_{i=1}^{n} CA_i\right)^2}{n \sum_{i=1}^{n} CA_i^2} \quad (2)$$

where $CA_i \geq 0 \forall i$ and $\Sigma j \leq n\ CA_j > 0$

Figure 3:
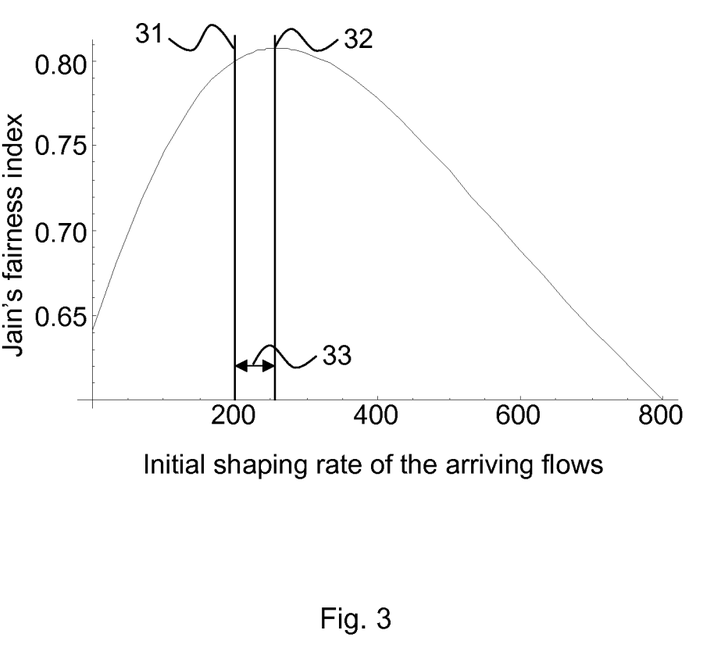
FIG. 3 shows a G(Y) function with example settings, wherein the fairness optimal shaping rate is different from the average shaping rate.

This fairness index equals one if the system is totally fair but tends to zero if the system is unfair. To determine the fairness optimal initial shaping rate, the following function is maximized:

$$G(Y) \stackrel{def}{=} F_{Jain's}(CA_1, \ldots, CA_n, Y) = \frac{\left(\sum_{i=1}^{n} CA_i + Y\right)^2}{(n+1)\left(\sum_{i=1}^{n} CA_i^2 + Y^2\right)} \quad (3)$$

FIG. 3 shows the G(Y) function according to equ. (3) with the following parameter settings:
n=5;
$CA_1$=100 kbps;
$CA_2$=100 kbps;
$CA_3$=200 kbps;
$CA_4$=200 kbps; and,
$CA_5$=400 kbps.

In FIG. 3, the average shaping rate of ongoing packet flows (200 kbps) is denoted 31 and the fairness optimal shaping rate is denoted 32. Reference number 33 is the difference due to unfair bandwidth share of the ongoing flows.

A and B are defined as follows:

$$A \stackrel{def}{=} \sum_{i=1}^{n} CA_i \quad (4)$$

$$B \stackrel{def}{=} \sum_{i=1}^{n} CA_i^2 \quad (5)$$

With these notations the G(Y) may be formulated as:

$$G(Y) = \frac{\left(\sum_{i=1}^{n} CA_i + Y\right)^2}{(n+1)\left(\sum_{i=1}^{n} CA_i^2 + Y^2\right)} = \frac{(A+Y)^2}{(n+1)(B+Y^2)} \quad (6)$$

It is easily seen that G(Y) is a differentiable function and its derivate function is:

$$G'(Y) = -\frac{2(A+Y)(-B+AY)}{(1+n)(B+Y^2)^2} \quad (7)$$

In order to get the maximum of the G(Y) according to equ. (7), the following equation is solved:

$$G'(Y)=0 \quad (8)$$

Equ. (8) only has one positive solution, which is:
$Y^* = B/A = \text{Sum}(CA^2)/\text{Sum}(CA) = \text{Avg}(CA) + \text{Var}(CA)/\text{Avg}(CA)$ Noticeable is that it may easily be proven that G(Y) has its maximum at $Y^*$.

The final formula may be interpreted as:
1) If the system is completely fair, the fairness-optimal shaping rate of the new flow is the common shaping rate of the ongoing flows, i.e. Avg(CA).
2) If there is some level of unfairness among the shaping rates of the flows, then the fairness-optimal shaping rate of the new flow is the average shaping rate of the ongoing flows increased with the relative variance (Var(CA)/Avg(CA)) of the shaping rate of the ongoing flows.

Figure 4:
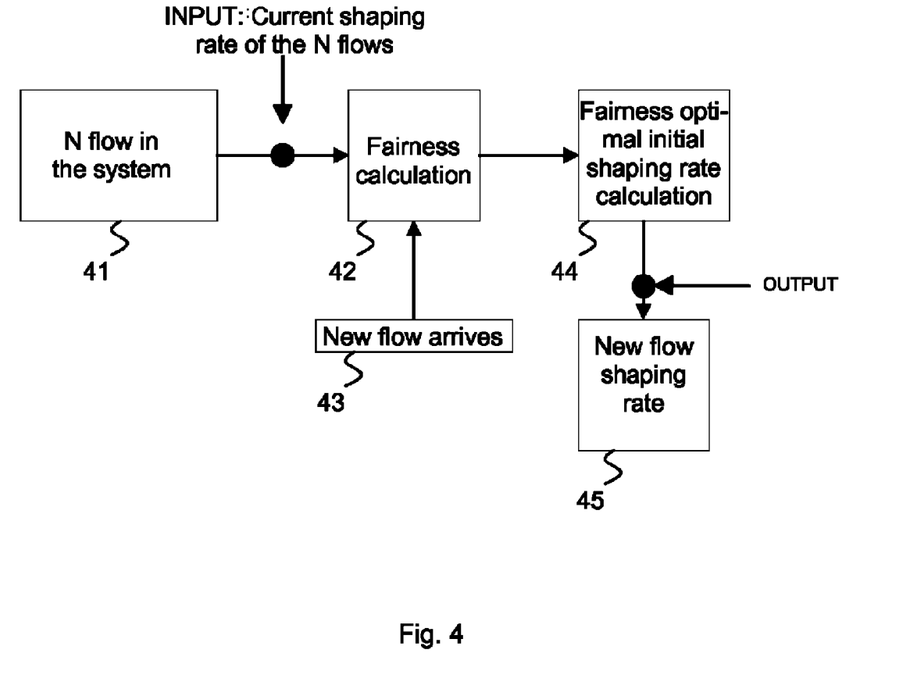
FIG. 4 shows the inventive method steps according to embodiments of the present invention.

To implement embodiments of the present invention, the flow control functionality in the Node-B is extended as shown in FIG. 4. There are N flow in the system (step 41) and optionally, a fairness calculations are done using the current shaping rates of the N flows as input (step 42). The actual CAs of the ongoing flows are available in the FC entity. When a new flow arrives (step 43) the fairness optimal initial shaping rate from the CAs of ongoing flows is calculated (step 44) using the following formula:

$$Y^* = \text{Avg}(CA) + \text{Var}(CA)/\text{Avg}(CA) \quad (9)$$

Then, the upper limit, e.g. the maximal Uu rate or a maximal rate that UE is capable of, and lower limit, e.g. a minimal per-flow bitrate, on the calculated bitrate is applied. And, a new flow shaping rate is obtained (step 45).

Only the CAs of the flows having the same transport network quality of service (QoS) shall be used. According to embodiments of the invention, only CAs of the flows, which have the same scheduling priority indicator (SPI) are used.

The inventive method is applicable for TN limited flows. It is advantageous to identify TN limited flows and only include those flows in the described procedure. In a similar way, flows which are poorly utilized may be excluded.

If for some reason only a subset of CAs is available, the inventive method may still be used on that subset. Reasons for having only a subset is e.g. more than one Node Bs sharing the same bottleneck or having several boards in the same RBS, where change of information requires too big effort.

Through simulation, advantages of embodiments of the present invention are illustrated. The recent P6 flow control is used as reference for comparison, i.e. the original algorithm, as described above in the background section. The TN bottleneck is a 4 Mbps ATM link (2.96 Mbps maximum TCP throughput) with 30 ms long TN buffer.

Figure 5:
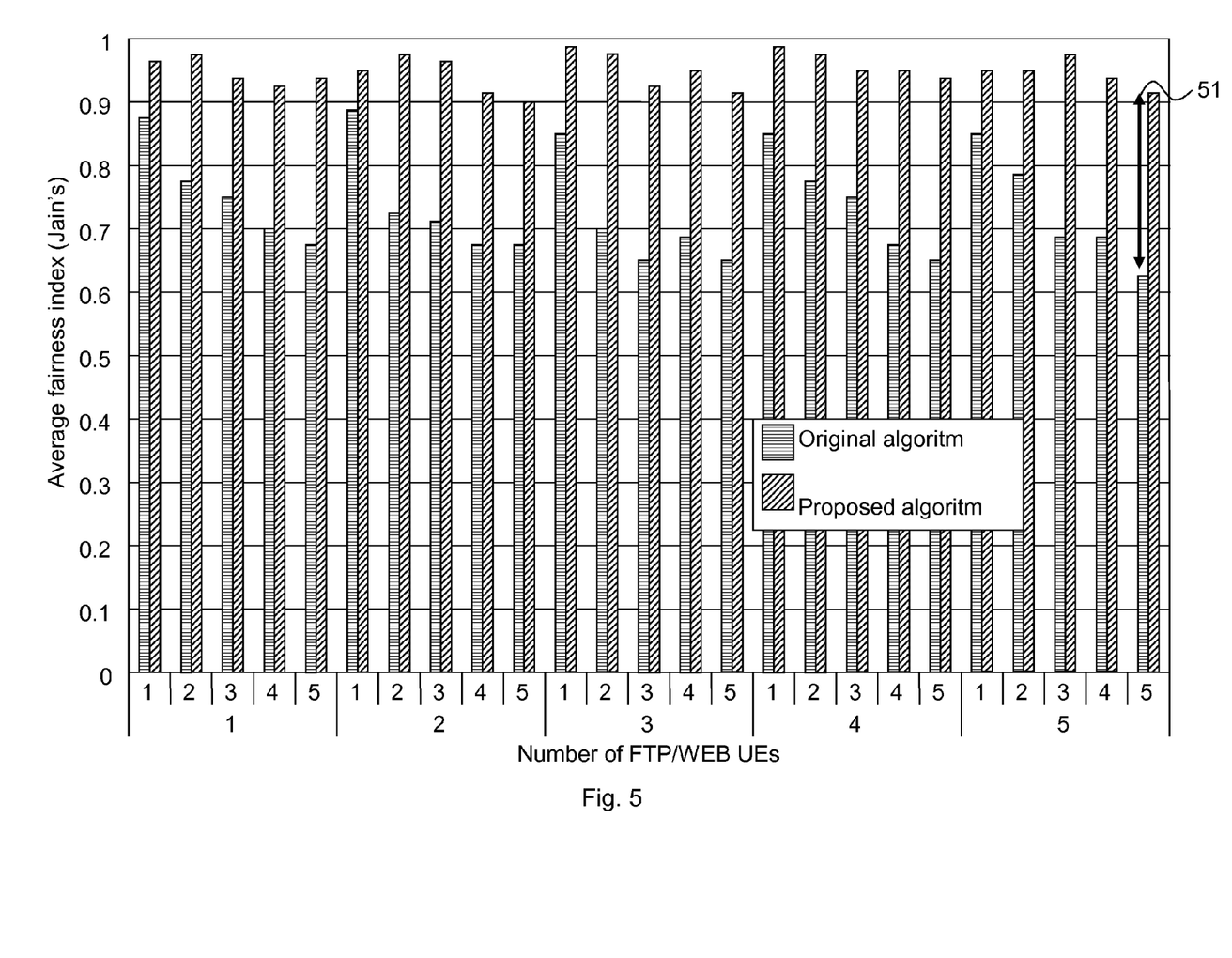
FIG. 5 shows fairness improvement.
Figure 6:
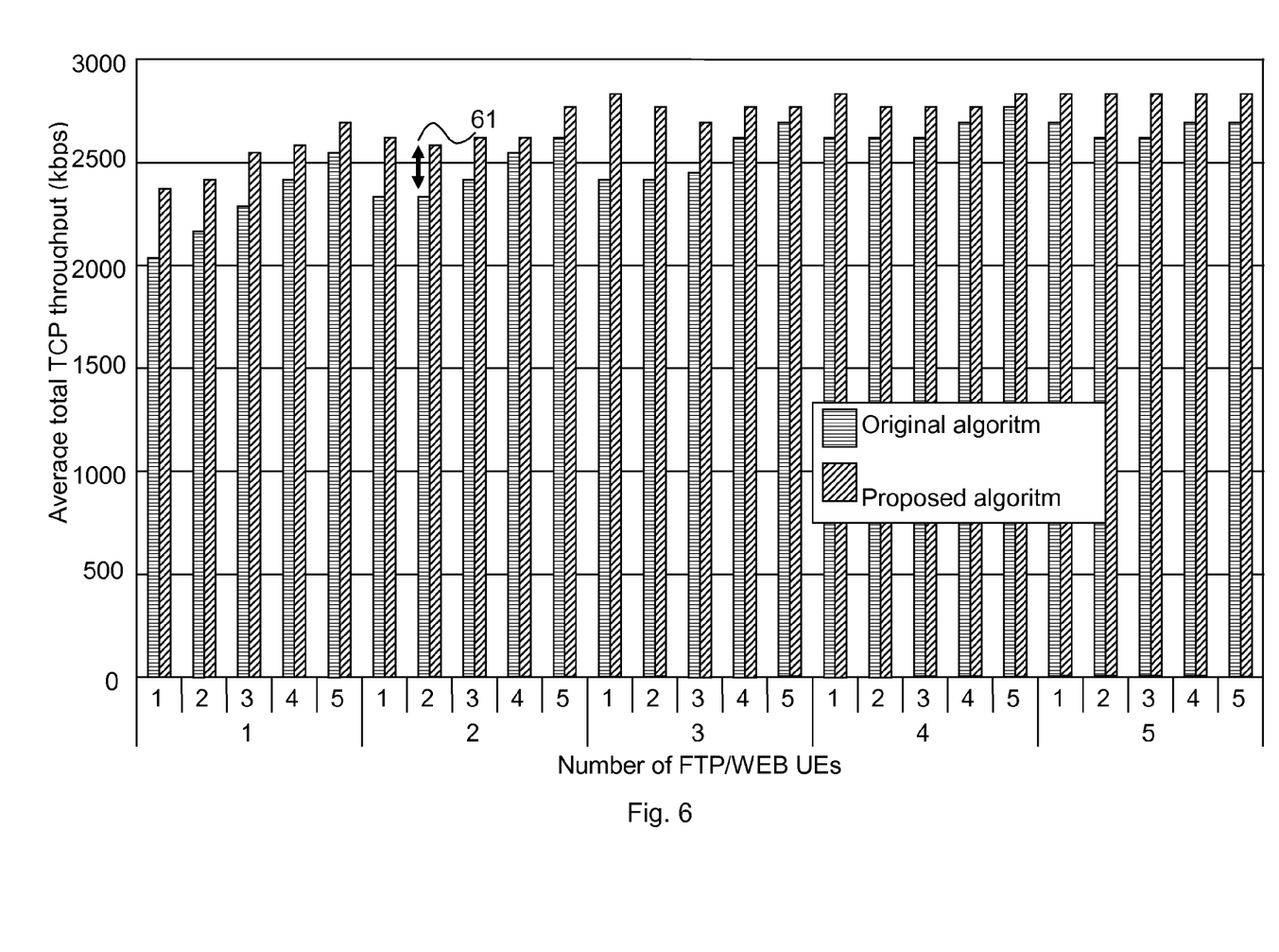
FIG. 6 shows aggregated TCP throughput improvement.

Mixed scenarios with long FTP downloads and shorter Web downloads were evaluated. FIG. 5 shows that the inventive method improved the fairness significantly illustrated with arrow 51, meanwhile, as FIG. 6 shows, the aggregated TCP throughput also increased, illustrated with arrow 61. In FIGS. 5 and 6, the diagrams show the number of FTP UEs, which is 5 as can be seen in the second row at the bottom of the diagrams, and the number of WEB UEs, which is 5×5 as can be seen in the first row at the bottom of the diagrams According to embodiments of the present invention, upper, e.g. maxUuRate, as well as lower limit on the shaping rate of the newly arrived flows is applied to make the FC more robust.

According to embodiments of the present invention, a slow-start like shaping rate increase, i.e. the flow rate is doubled in each round trip time until congestion occurs, or a linear shaping rate increase for the newly arrived flows is used. The starting point of the shaping rate is the fairness optimal one in both cases.

According to embodiments of the present invention, a slow-start like shaping rate increase when there are no ongoing flows is used, or the former shaping rates may be relied upon.

Figure 7:
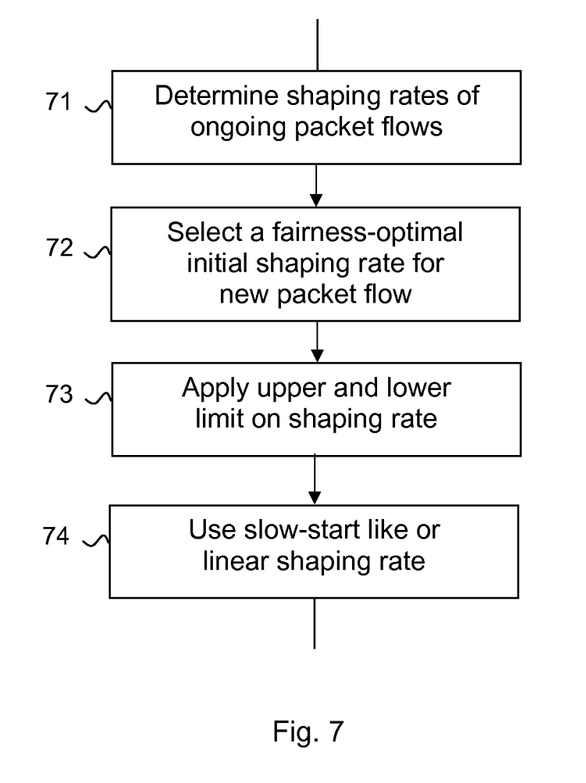
FIG. 7 is a flowchart of the inventive method according to embodiments of the present invention.

According to a general embodiment of the present invention a procedure for achieving an optimal initial shaping rate for a new packet flow on a transport network between a first and a second communication network node in a communication network system, as shown in FIG. 7, is provided. The procedure comprises the steps of:
 determining shaping rates of ongoing packet flows (step 71);
 based on the determined shaping rates of ongoing packet flows, selecting an initial shaping rate for the new packet flow such that a maximized fairness among all shaping rates is obtained (step 72).

According to some embodiments, said shaping rate of said new packet flow is determined by calculating a fairness optimal initial shaping rate from capacity allocations "CA" of ongoing flows.

According to some embodiments, said fairness optimal initial shaping rate is calculated using the formula $Y^* = Avg(CA) + Var(CA)/Avg(CA)$, wherein $Avg(CA)$ is an average shaping rate of ongoing flows and $Var(CA)/Avg(CA)$ is the relative variance of a shaping rate of ongoing flows.

According to some embodiments, the method further comprises the step of using said capacity allocations of the ongoing flows which have the same scheduling priority indicator "SPI".

According to some embodiments, the method further comprises the step of applying an upper and/or a lower limit on said shaping rate for said new packet flow (step 73), wherein said upper limit is a maximal rate on a Uu-interface or a maximal rate that UE is capable of and said lower limit is a minimal per-flow bitrate.

According to some embodiments, the method further comprises the step of using a slow-start like shaping rate increase for said new packet flow (step 74).

According to some embodiments, the method further comprises the step of using a linear shaping rate increase for said new packet flow (step 74).

According to some embodiments, when there are no ongoing flows, the method comprises the step of using a slow-start like shaping rate increase for said new packet flow.

Figure 8:
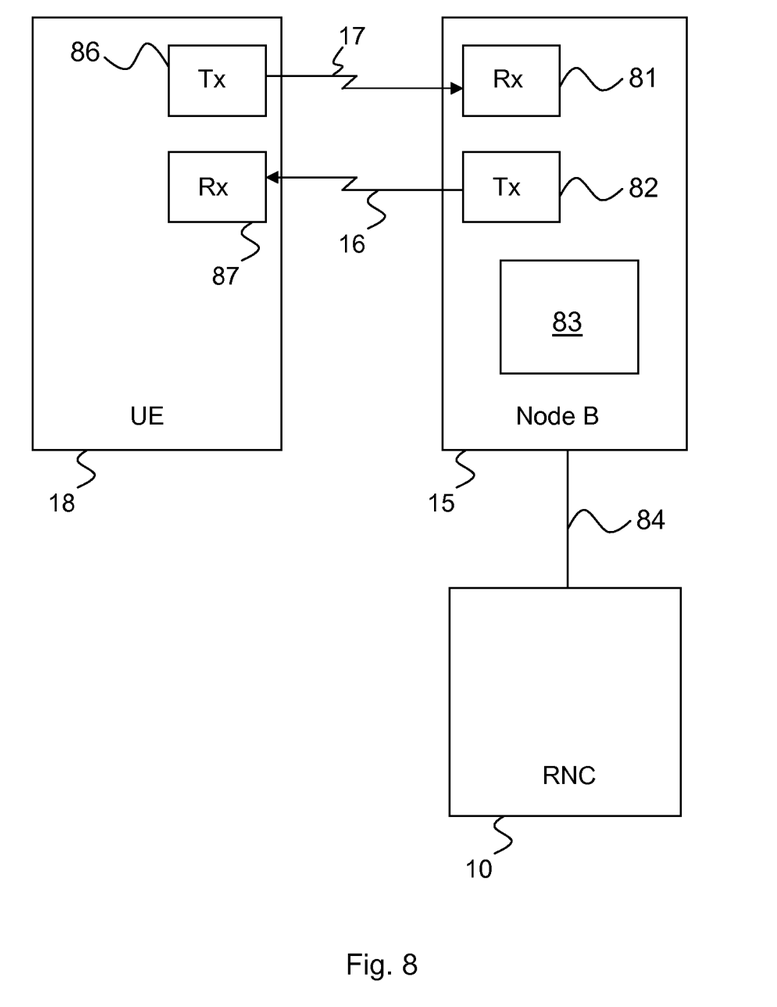
FIG. 8 shows a block diagram of an inventive communication network node communicating with a user equipment and another communication network node.

FIG. 8 is a block diagram showing a user equipment 18 and a first communication network node 15, such as Node B, and a second communication network node 10, such as the RNC, for achieving an optimal initial shaping rate for a new packet flow on a transport network 84 between said first communication network node 15 and said second communication network node 10 in a communication network system.

The Node B 15 comprises a transmitting unit 82 including a radio transmitter. The Node B 15 further comprises a receiving unit 81 including a receiver. The transmitter 82 is transmitting data to a receiver 87 of the user equipment 18 over a radio interface on the downlink channel 16. The receiver 81 is receiving data from the user equipment 18 on the uplink channel 17. Node B 15 further comprises a processing unit 83 arranged to determine shaping rates of ongoing packet flows on said transport network 84 and to select an initial shaping rate for said new packet flow based on said determined shaping rates of ongoing packet flows so as to obtain a maximized fairness among all shaping rates.

The user equipment 18 comprises a transmitting unit 86 including a radio transmitter. The radio transmitter 86 is arranged to transmit data packets to the receiver 81 of the Node B 15 over the radio interface on the uplink channel 17. The UE 18 further comprises a receiving unit 87 including a receiver. The receiver 87 is arranged to receive data packets transmitted from the transmitter 82 of the Node B 15 on the downlink channel 16.

According to some embodiments, said processing unit 83 is arranged to determine said shaping rate of the new packet flow by calculating a fairness optimal initial shaping rate from capacity allocations "CA" of ongoing flows.

According to some embodiments, said processing unit 83 is arranged to calculate said fairness optimal initial shaping rate using the formula $Y^* = Avg(CA) + Var(CA)/Avg(CA)$, wherein $Avg(CA)$ is an average shaping rate of ongoing flows and $Var(CA)/Avg(CA)$ is the relative variance of a shaping rate of ongoing flows.

According to some embodiments, said processing unit 83 is further arranged to use said capacity allocations of the ongoing flows which have the same scheduling priority indicator "SPI".

According to some embodiments, said processing unit 83 is further arranged to apply an upper and/or a lower limit on said shaping rate for said new packet flow, wherein said upper limit is a maximal rate on a Uu-interface or a maximal rate that UE is capable of and said lower limit is a minimal per-flow bitrate.

According to some embodiments, said processing unit 83 is further arranged to use a slow-start like shaping rate increase for said new packet flow.

According to some embodiments, said processing unit 83 is further arranged to use a linear shaping rate increase for said new packet flow.

According to some embodiments, when there are no ongoing flows, said processing unit 83 is further arranged to use a slow-start like shaping rate increase for said new packet flow.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim embodiments of the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method in a communication network node of achieving an optimal initial shaping rate for a new packet flow on a transport network between said communication network node and a second communication network node in a communication network system, characterized in that, the method comprises the steps of:
    determining, by a processor, shaping rates of ongoing packet flows on said transport network, the said shaping rate of said new packet flow being determined by calculating a fairness optimal initial shaping rate from capacity allocations "CA" of ongoing flows;
    selecting, by the processor, based on said determined shaping rates of ongoing packet flows, an initial shaping rate for said new packet flow so as to obtain a maximized fairness among all shaping rates, the fairness optimal initial shaping rate being calculated using the formula Avg(CA)+Var(CA)/Avg(CA), wherein Avg(CA) is an average shaping rate of ongoing flows and Var(CA)/Avg(CA) is the relative variance of a shaping rate of ongoing flows.

2. The method according to claim 1, wherein the method further comprises the step of using said capacity allocations of the ongoing flows which have the same scheduling priority indicator "SPI".

3. The method according to claim 1, wherein the method further comprises the step of applying an upper and/or a lower limit on said shaping rate for said new packet flow, wherein said upper limit is a maximal rate on a Uu-interface or a maximal rate that a user equipment is capable of and said lower limit is a minimal per-flow bitrate.

4. The method according to claim 1, wherein the method further comprises the step of using a slow-start like shaping rate increase for said new packet flow.

5. The method according to claim 1, wherein the method further comprises the step of using a linear shaping rate increase for said new packet flow.

6. The method according to claim 1, wherein, when there are no ongoing flows, the method comprises the step of using a slow-start like shaping rate increase for said new packet flow.

7. A communication network node for achieving an optimal initial shaping rate for a new packet flow on a transport network between said communication network node and a second communication network node in a communication network system, the communication network node comprises:
    a processor arranged to determine shaping rates of ongoing packet flows on said transport network and to select an initial shaping rate for said new packet flow based on said determined shaping rates of ongoing packet flows so as to obtain a maximized fairness among all shaping rates,
    the processor being further arranged to determine said shaping rate of said new packet flow by calculating a fairness optimal initial shaping rate from capacity allocations (CA) of ongoing flows, and the processor being further arranged to calculate said fairness optimal initial shaping rate using the formula Avg(CA)+Var(CA)/Avg(CA), wherein Avg(CA) is an average shaping rate of ongoing flows and Var(CA)/Avg(CA) is the relative variance of a shaping rate of ongoing flows, wherein the communication network node comprises: a radio receiver for receiving a radio signal, a radio transmitter for transmitting a radio signal.

8. The communication network node according to claim 7, wherein said communication network node is further configured to use said capacity allocations of the ongoing flows which have the same scheduling priority indicator.

9. The communication network node according to claim 7, wherein said communication network node is further configured to apply an upper and/or a lower limit on said shaping rate for said new packet flow, wherein said upper limit is a maximal rate on a Uu-interface or a maximal rate that a user equipment is capable of and said lower limit is a minimal per-flow bitrate.

10. The communication network node according to claim 7, wherein said communication network node is further configured to use a slow-start like shaping rate increase for said new packet flow.

11. The communication network node according to claim 7, wherein said communication network node is further configured to use a linear shaping rate increase for said new packet flow.

12. The communication network node according to claim 7, wherein, when there are no ongoing flows, said communication network node is configured to use a slow-start like shaping rate increase for said new packet flow.

* * * * *

UNITED STATES PATENT AND TRADEMARK OFFICE
CERTIFICATE OF CORRECTION

| | |
|---|---|
| PATENT NO. | : 8,542,608 B2 |
| APPLICATION NO. | : 13/000407 |
| DATED | : September 24, 2013 |
| INVENTOR(S) | : Racz et al. |

Page 1 of 1

It is certified that error appears in the above-identified patent and that said Letters Patent is hereby corrected as shown below:

In the Drawings

In Fig. 5, Sheet 5 of 8, delete "original algoritm" and insert -- original algorithm --, therefor.

In Fig. 5, Sheet 5 of 8, delete "Proposed algoritm" and insert -- Proposed algorithm --, therefor.

In Fig. 6, Sheet 6 of 8, delete "original algoritm" and insert -- original algorithm --, therefor.

In Fig. 6, Sheet 6 of 8, delete "Proposed algoritm" and insert -- Proposed algorithm --, therefor.

In the Specifications

In Column 1, Line 29, delete "then" and insert -- than --, therefor.

In Column 1, Line 34, delete "that" and insert -- than --, therefor.

In Column 4, Line 66, delete "then" and insert -- than --, therefor.

In the Claims

In Column 10, Line 31, in Claim 8, delete "indicator." and insert -- indicator (SPI). --, therefor.

Signed and Sealed this
Twenty-fifth Day of March, 2014

Michelle K. Lee
*Deputy Director of the United States Patent and Trademark Office*